US007775460B2

(12) United States Patent
Berg et al.

(10) Patent No.: US 7,775,460 B2
(45) Date of Patent: Aug. 17, 2010

(54) COMBUSTION NOZZLE FLUIDIC INJECTION ASSEMBLY

(75) Inventors: Gerald R. Berg, Renton, WA (US); Nathan L. Messersmith, South Windsor, CT (US); Gary L. Lidstone, Federal Way, WA (US); John Hinkey, Seattle, WA (US)

(73) Assignee: United Technologies Corporation, Hartford, CT (US)

( * ) Notice: Subject to any disclaimer, the term of this patent is extended or adjusted under 35 U.S.C. 154(b) by 967 days.

(21) Appl. No.: 11/585,597

(22) Filed: Oct. 24, 2006

(65) Prior Publication Data
US 2008/0092543 A1 Apr. 24, 2008

(51) Int. Cl.
B63H 25/46 (2006.01)
F02K 1/00 (2006.01)
(52) U.S. Cl. .................................. 239/265.17; 60/770
(58) Field of Classification Search ............. 60/761, 60/764, 770, 231, 200.1, 39.5, 226.1, 262; 239/265.17
See application file for complete search history.

(56) References Cited

U.S. PATENT DOCUMENTS

| 2,793,493 | A | * | 5/1957 | Kadosch et al. | 239/265.17 |
| 2,883,828 | A | * | 4/1959 | Howell | 60/246 |
| 3,204,405 | A | * | 9/1965 | Bowles et al. | 60/231 |
| 3,603,094 | A | * | 9/1971 | Townend | 60/761 |
| 4,000,612 | A | | 1/1977 | Wakeman et al. | |
| 4,077,572 | A | * | 3/1978 | Fitzgerald | 239/265.17 |
| 4,512,315 | A | * | 4/1985 | Tomisawa | 123/478 |
| 4,947,644 | A | * | 8/1990 | Hermant | 60/257 |
| 5,257,496 | A | * | 11/1993 | Brown et al. | 60/773 |
| 5,664,415 | A | * | 9/1997 | Terrier | 60/204 |
| 5,694,766 | A | | 12/1997 | Smereczniak et al. | |
| 6,112,512 | A | | 9/2000 | Miller et al. | |
| 6,112,513 | A | | 9/2000 | Catt et al. | |
| 6,195,981 | B1 | | 3/2001 | Hanley et al. | |
| 6,336,319 | B1 | | 1/2002 | Koshoffer | |
| 6,758,032 | B2 | | 7/2004 | Hunter et al. | |
| 6,868,665 | B2 | | 3/2005 | Koshoffer et al. | |
| 7,269,951 | B2 | * | 9/2007 | Gratton et al. | 60/770 |

OTHER PUBLICATIONS

D. Miller, et al., "Pulsed Injection for Nozzle Throat Area Control," a Final Technical Report from Lockheed Martin Corporation, Feb. 5, 2001.
O. Peraldi, et al., "Criteria for Transition to Detonation in Tubes," from *Twenty-first Symposium (Int'l.) on Combustion/The Combustion Institute*, pp. 1629-1637, 1986.

* cited by examiner

*Primary Examiner*—Michael Cuff
*Assistant Examiner*—Gerald L Sung
(74) *Attorney, Agent, or Firm*—Kinney & Lange, P.A.

(57) ABSTRACT

A fluid flow system for use with a gas turbine engine includes an exhaust nozzle, a primary air supply valve, a distribution manifold connected to the primary fluid supply valve and in fluid communication therewith, and a plurality of fluid injector assemblies positioned at the exhaust nozzle and connected in fluid communication with the distribution manifold. Each fluid injector assembly includes a first tube, a secondary air valve positioned at least partially within the first tube and in fluid communication with the distribution manifold, a fuel valve positioned at least partially within the first tube and located downstream of the air valve, an igniter extending into the first tube downstream of the fuel valve, and an outlet in fluid communication with the first tube and connected in fluid communication with the exhaust nozzle. The outlet has a different geometry than the first tube.

20 Claims, 6 Drawing Sheets

COMBUSTION NOZZLE FLUIDIC INJECTION ASSEMBLY

BACKGROUND OF THE INVENTION

The present invention relates to fluidic injection systems for use with combustion engines, and more particularly to fluidic injection assemblies for controlled injection of fluid relative to an exhaust nozzle of a gas turbine engine.

In order to implement an augmented gas turbine engine cycle, a variable area nozzle is generally required to provide proper engine backpressure and flow matching throughout an operational range. Variable geometry nozzles for aircraft engines are well-known in the art as a means for providing nozzle throat area control and nozzle exit area control. These systems use mechanically actuated deflectors or other mechanical structures to control physical nozzle area characteristics. Some variable geometry nozzles can also provide thrust vectoring, that is, controllable deflection of exhaust gas flow. However, mechanical complexity, restrictive geometry options, weight and maintenance demands are significant requirements for most variable geometry nozzle designs.

Fluidic injection systems used with fixed geometry nozzles are an alternative to variable geometry designs. These fluidic injection systems utilize engine bleed air directed to the engine nozzle to control an effective nozzle area. For example, Koshoffer, U.S. Pat. No. 6,336,319, discloses non-combusting fluidic injection system for a gas turbine engine nozzle, which utilizes compressor bleed air injected directly into the nozzle area without any combustion process to further pressurize the bleed air. Hunter et al., U.S. Pat. No. 6,758,032, discloses a pulse detonation fluidic injection system for a gas turbine engine nozzle. Hunter et al. discloses the use of compressor bleed air by the pulse detonation fluidic injection system, and seeks uniform and non-turbulent fluidic injection flows. Hunter et al. utilizes pulse detonation waves that are distinguished from deflagration combustion processes.

However, known fluidic injection systems have opportunities for improvement. Many require excessive engine bleed flows, which presents an undesirable performance drawback. Compressor bleed air is "expensive" air, and combustion nozzle fluidic injection system that utilize compressor bleed air present a particularly undesirable drain on engine efficiency by decreasing the mass of the primary gas turbine engine flow. Moreover, existing designs are often relatively large and heavy.

It is desired to provide a relatively light and compact combustion nozzle fluidic injection apparatus that has minimal bleed air requirements.

BRIEF SUMMARY OF THE INVENTION

A fluid flow system for use with a gas turbine engine includes an exhaust nozzle, a primary air supply valve, a distribution manifold connected to the primary fluid supply valve and in fluid communication therewith, and a plurality of fluid injector assemblies positioned at the exhaust nozzle and connected in fluid communication with the distribution manifold. Each fluid injector assembly includes a first tube, a secondary air valve positioned at least partially within the first tube and in fluid communication with the distribution manifold, a fuel valve positioned at least partially within the first tube and located downstream of the air valve, an igniter extending into the first tube downstream of the fuel valve, and an outlet in fluid communication with the first tube and connected in fluid communication with the exhaust nozzle. The outlet has a different geometry than the first tube.

DETAILED DESCRIPTION

The present invention relates to a combustion nozzle fluidic injection system for use on an aircraft having one or more gas turbine engines to provide effective throat area control and/or thrust vectoring. Some form of throat area (and/or exhaust nozzle expansion surface) control is typically required to provide optimal system performance with augmented gas turbine engine cycles. The system of the present invention allows the use of either pulse detonation combustion or fast deflagration combustion (also called strong deflagration combustion) to pressurize bleed air for injection at a combustion nozzle of the aircraft. Fan bleed air can be utilized. Each fluidic injection assembly generally includes an air valve, a fuel injector, an igniter and a combustion tube that forms an outlet at the combustion nozzle throat area. The combustion tube can optionally have a bifurcated configuration, with a number of outlets defined therein. A secondary tube can also optionally be provided surrounding the combustion tube. Further details of the various embodiments of the present invention will be understood in view of the description below.

Figure 1:
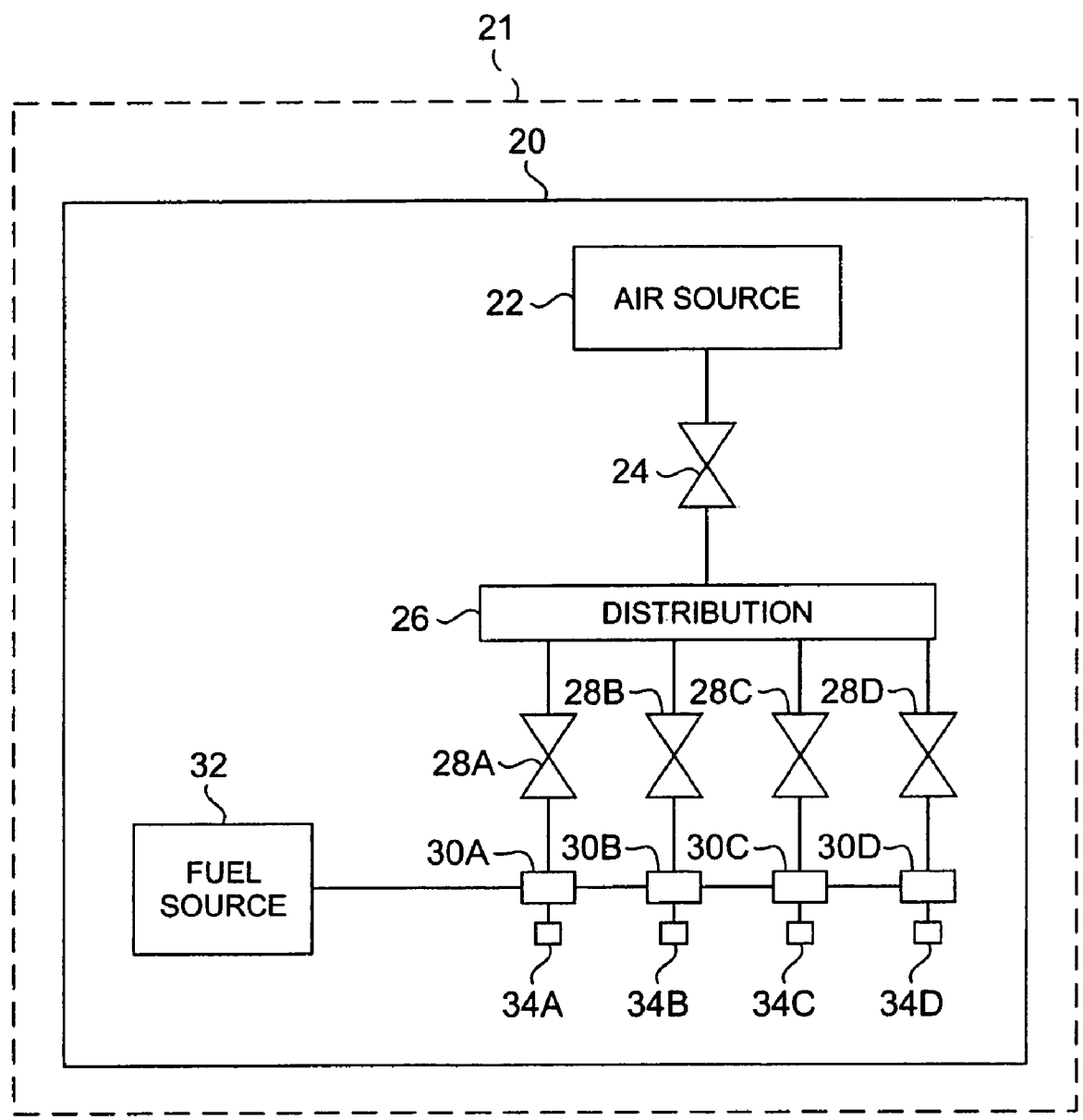
FIG. 1 is a block diagram of a fluidic injection assembly for an aircraft according to the present invention.

FIG. 1 is a block diagram of a fluidic injection assembly 20 of an aircraft 21. The fluidic injection assembly 20 includes an air source 22, a bleed air valve 24, a distribution manifold 26, a number of air valves 28A-28D, a number of fuel injector valves 30A-30D, a fuel source 32, and a number of igniters 34A-34D.

The air source 22 is a suitable bleed air collection structure for obtaining bleed air from a fan stage of a gas turbine engine of the aircraft 21. In alternative embodiments, the air source 22 can obtain bleed air from other sources. However, the use of fan bleed air is advantageous. Bleeding air off the primary engine flow from other, highly pressurized air sources, such as from a compressor bleed air source, results in primary flowpath engine performance efficiency losses. Bleeding lower pressure fan air reduces the engine efficiency loss associated with bleeding highly pressurized air from the primary engine flow.

The bleed air valve 24 is a conventional actively controlled air valve, such as a solenoid or fluidically controlled air valve, that allows gross on/off control of bleed air flow from the air source 22. The bleed air valve 24 has a response time comparable to overall fluidic injection system response time requirements, which will vary according to the particular application. It is possible to omit the bleed air valve 24 in alternative embodiments. From the bleed air valve 24, air flows to the distribution manifold 26, which is used to direct bleed air to a number of discrete fluidic injection subassemblies. The distribution manifold 26 has a volume V. However, it should be recognized that the distribution manifold 26 is optional, and in alternative embodiments a single air bleed valve 24 can be connected to a single second air valve 28 without a distribution manifold between them.

The distribution manifold 26 directs bleed air to each of the air valves 28A-28D, which can be passive fluidic check valves or other types of actively controlled mechanical, electromechanical or fluidic valves. The air valves 28A-28D help control bleed air flow to ensure proper operation of the fluidic injector assembly 20 at operating conditions. The use of actively controlled bleed valve 24 permits the use of passive check valves for the air valves 28A-28D. However, in alternative embodiments where the bleed air valve 24 is omitted, the use of actively controlled air valves 28A-28D may be necessary. A length L is defined along the fluid paths between the bleed air valve 24 and the air valves 28A-28D. Fluid system response is related to the length L and the volume V of the distribution manifold 26, but fluid system response becomes less important where the length L is reduced. It should be noted that upstream acoustic effects due to the air valves 28A-28D can be relieved by increasing the volume V of the distribution manifold 26.

The fuel valves (or injectors) 30A-30D are each positioned generally downstream of the air valves 28A-28D, respectively. The fuel valves 30A-30D can be solenoid valves, or any other suitable mechanically, electromechanically or fluidically controlled valves. Each of the fuel valves 30A-30D is linked to the fuel source 32. The fuel source 32 can provide the same fuel as used to power the primary gas turbine engine combustion process, or can be a different type of fuel.

Bleed air from the air valves 28A-28D and fuel from the fuel valves 30A-30D mix and can then be ignited by the respective igniters 34A-34D, which can be conventional electrostatic spark-plug-like igniters or other types of suitable igniters for generating heat to cause fuel/air mixture combustion (e.g., those utilizing hot exhaust gases present at the engine combustion nozzle to initiate combustion). The igniters 34A-34D selectively ignite the fuel/air mixture at desired control frequencies to produce a desired combustion response. The igniters 34A-34D are operated at pulsed cycle frequency rates of up to about 1 kHz. Combustion exhaust is then directed into the combustion nozzle of the aircraft 21 in order to provide desired throat area control and/or thrust vectoring.

Figure 2:
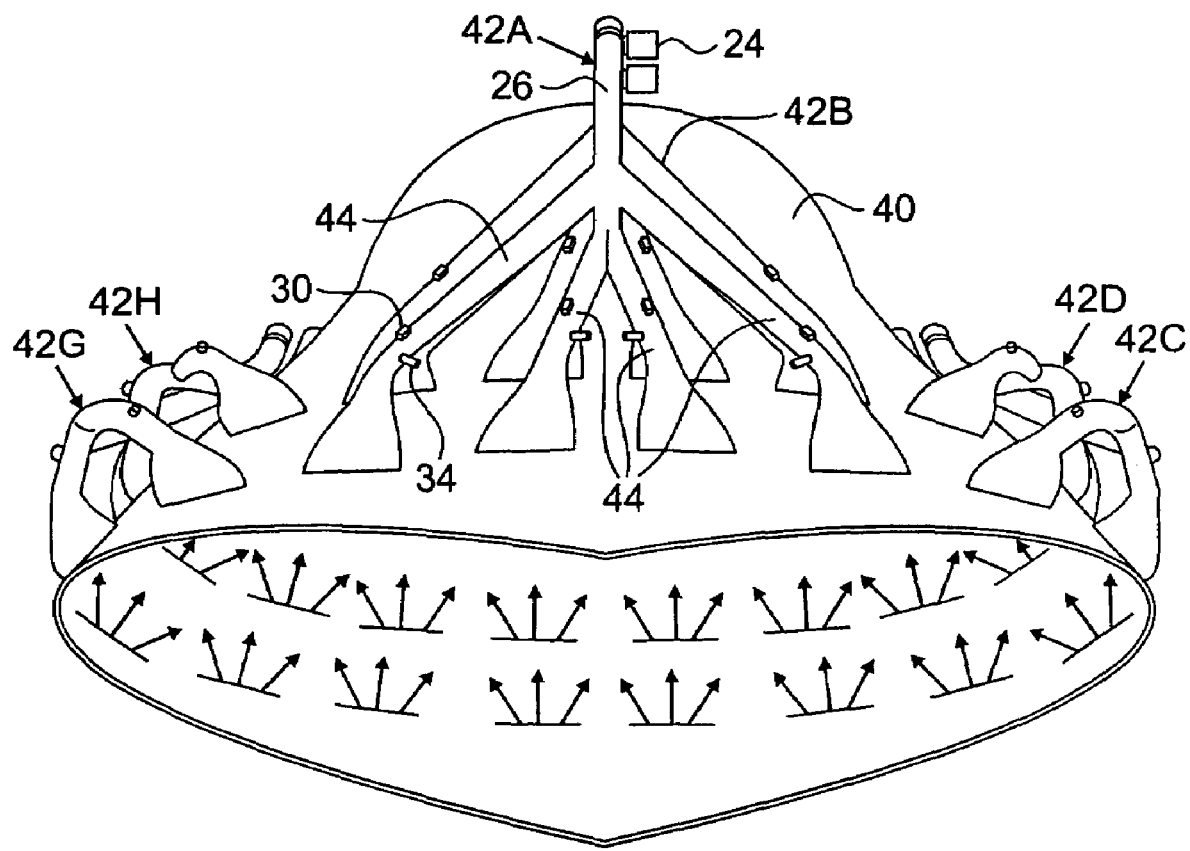
FIG. 2 is a perspective view of a first embodiment of a combustion nozzle utilizing a number of fluidic injection assemblies.

FIG. 2 is a perspective view of a first embodiment of a combustion nozzle 40 utilizing a number of fluidic injection assemblies. The combustion nozzle 40 has a fixed geometry in a conventional converging-diverging shape. However, it should be recognized that in further embodiments the combustion nozzle 40 can have other suitable shapes beyond the illustrated shape, as desired. Mounted relative to the combustion nozzle are eight fluidic injection assemblies 42A-42H (assemblies 42E and 42F are not visible in FIG. 2). Each fluidic injection assembly 42A-42H can be similar to that described with respect to FIG. 1. As shown with respect to fluidic injection assembly 42A (reference numbers have been omitted from the other fluidic injection assemblies 42B-42H for simplicity), each assembly 42A-42H includes a bleed air valve 24, a distribution manifold 26, and four fluidic injection subassemblies 44.

Operation of the fluidic injection assemblies 42A-42H can be controlled to adjust effective nozzle area. Each of the assemblies 42A-42H can be controlled independently from one another, or controlled as discrete groups of multiple assemblies, in order to achieve thrust vectoring. For example, during augmented gas turbine engine cycles, the effective nozzle area requirement is larger than with non-augmented cycles, and the use of the fluidic injection assemblies 42A-42H can be diminished, suspended, or limited only to thrust vectoring. The general principles of using fluidic injection to achieve nozzle area control and thrust vectoring will be understood by those of ordinary skill in the art (see, e.g., FIGS. 2-6 of Koshoffer, U.S. Pat. No. 6,336,319).

The particular embodiment of the fluidic injection assemblies 42A-42H shown in FIG. 2 is merely exemplary. Particular fluidic injection assembly configurations in further embodiments can vary as a function of fuel/air combustion physics, injection pressure and velocities required for engine combustion nozzle operation, and the level of injection control required by the control system or pilot during flight.

Figure 3:
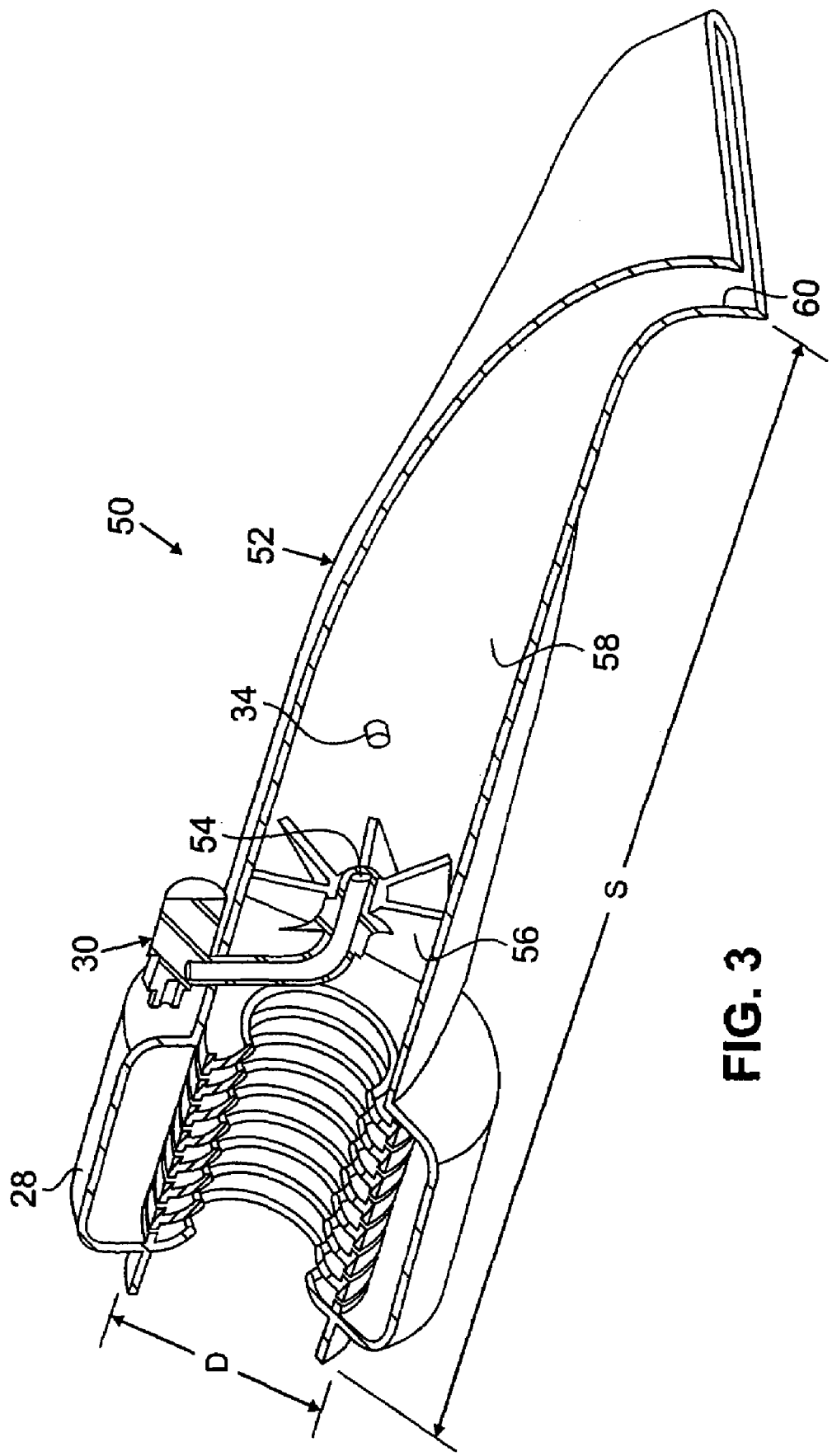
FIG. 3 is a cutaway perspective view of a first embodiment of a fluidic injection subassembly.

FIG. 3 is a cutaway perspective view of a first embodiment of a fluidic injection subassembly 50, suitable for use with the assemblies 42A-42H described with respect to FIG. 2. The fluidic injection subassembly 50 shown in FIG. 3 includes an air valve 28, a fuel injector 30, and igniter 34 and a combustion tube 52.

The air valve 28 is a passive air check valve connected to the combustion tube 52, and ensures one-way movement of bleed air (e.g., fan bleed air) into the combustion tube 52. The air valve 28 is configured with a series of annular fins equally spaced along the length of the air valve 28 that define a central flowpath. However, it should be recognized that the particular configuration of the air valve 28 can vary as desired. As mentioned above, in alternative embodiments, an actively controlled air valve can be used instead of the passive air valve 28.

The fuel injector 30 extends into the combustion tube 52 at a location generally downstream of the air valve 28. The fuel injector 30 includes a fuel outlet portion 54 positioned at approximately the center of the combustion chamber 52, and is supported there by supports 56. The supports 56 extend between the outlet portion 54 of the fuel injector 30 and the walls of the combustion chamber 52, and can be aerodynamically shaped to interact with or influence fluid flows in the combustion chamber 52 in a desired fashion. The fuel injector 30 can include a solenoid-type active valve mechanism (the interior details of the injector 30 are not shown in detail in FIG. 3 for simplicity).

The igniter 34 is a conventional electrostatic spark-plug-like igniter, which extends into the combustion chamber 52 at a location generally downstream of both the air valve 28 and the fuel injector 30. As is explained further below, the igniter 34 is used to controllably ignite fuel/air mixtures present in the combustion chamber 52 at an operational frequency (e.g., up to about 1 kHz).

The combustion tube 52 includes an upstream portion 58 and an outlet nozzle 60. The upstream portion 58 is tubular with a substantially cylindrical shape. The combustion tube 52 has a diameter D, which can be about 2.54-10.16 cm (1-4 inches) in one embodiment. The particular diameter D will be determined as a function of combustion limits of the injection subassembly 50. The air valve 28, the fuel injector 30 and the igniter 34 are all positioned at the upstream portion 58 of the combustion tube 52. The outlet nozzle 60 is formed unitarily with the upstream portion 58, and has a generally rectangular, slot-like geometry that can be positioned to provide a fluid exit from the combustion tube 52 at the wall of a combustion nozzle of an aircraft where the subassembly 50 is installed. The outlet nozzle 60 produces a change in shape and backpressure in fluid flows passing from the upstream portion 58 through the outlet nozzle 58. The change in shape produced by the outlet nozzle 60 helps to control pre-combustion filling pressure of the combustion tube 52. The geometry of the outlet nozzle 60 also will be shaped to provide an efficient exit for fluidic engine combustion nozzle control. A length S of the combustion tube 52, measured from the upstream end of the upstream portion 58 to the downstream end of the outlet nozzle 60, is defined so as to be suitable for supporting the initiation of high-speed combustion and for accommodating other operational factors such as required operating detonation transition length, operational frequency, blow-down time and fill time. It will be recognized by those of ordinary skill in the art that the particular configuration and shape of the combustion tube 52 can vary.

The operation of the fluidic injection subassembly 50 can be understood as follows. During non-augmented subsonic flight, bleed air (e.g., fan bleed air or compressor bleed air) is directed through the air valve 28 and mixes with fuel from the fuel injector 30 in the combustion tube 52. Filling pressure in the combustion tube 52 is maintained by the geometry of the outlet nozzle 60. Once a suitable fuel/air charge is present in the combustion tube 52, combustion can be initiated. The fuel air charge is controlled by the air valve 28 and the fuel injector 30 (as well as optionally with a bleed valve 24 as described with respect to FIG. 1). Combustion is initiated in the combustion tube 52 by the igniter 34 in a pulsed fashion to produce, as desired, either a full detonation supersonic wave or a fast deflagration (synonymously called strong deflagration) supersonic wave.

Figure 4:
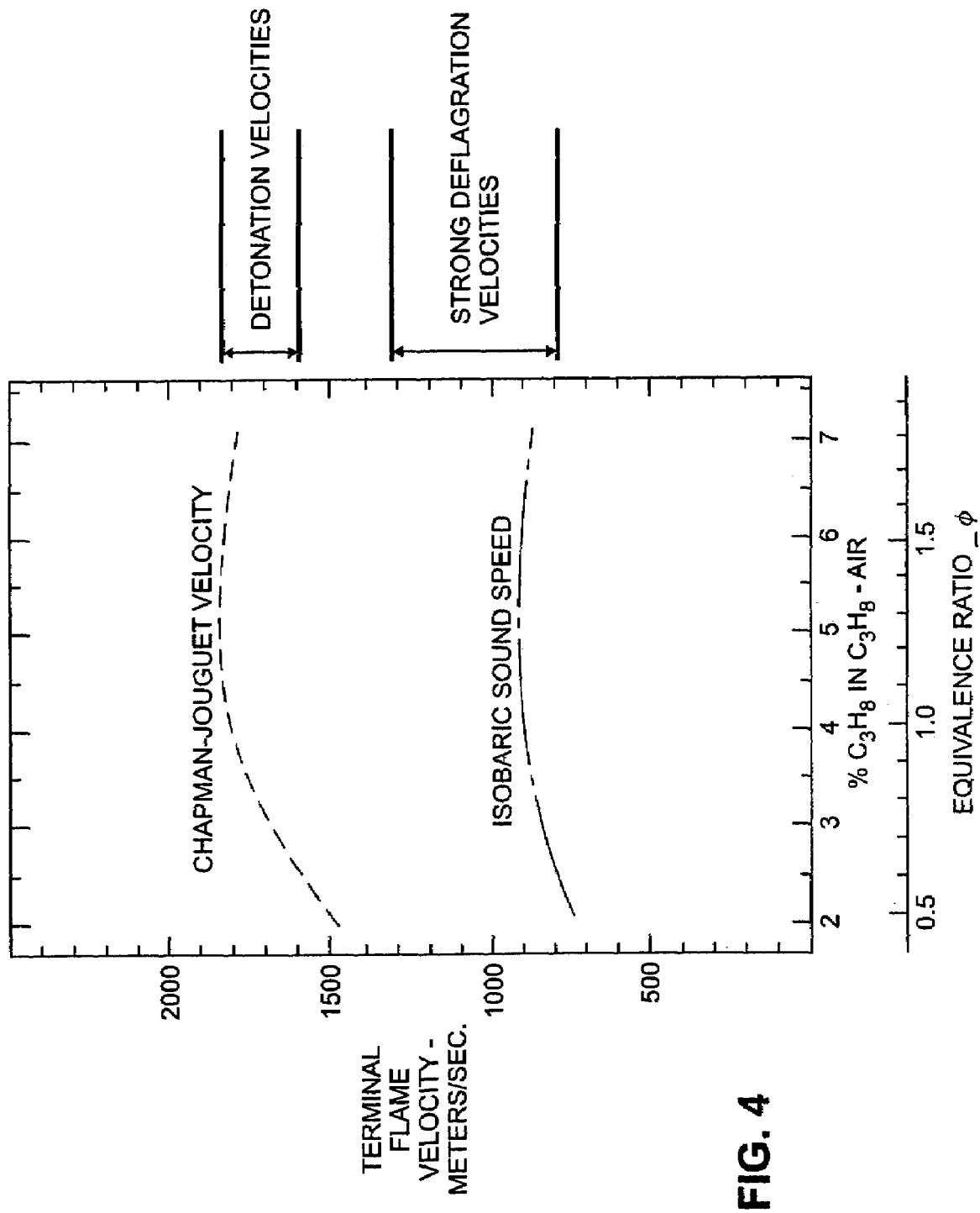
FIG. 4 is a graph of terminal air velocity versus fuel-air ratio showing ranges of detonation velocities and strong deflagration velocities.

FIG. 4 is an exemplary graph of terminal air velocity versus fuel-air ratio showing ranges of detonation velocities and strong deflagration velocities for $C_3H_8$ fuel and air mixtures. Similar curves exist for other fuel/air mixtures. As shown in FIG. 4, detonation velocities approach the Chapman-Jouguet curve. Fast or strong deflagration velocities are just beyond the isobaric sound speed curve. With reference to FIG. 4, it can be understood that fast deflagration combustion involves somewhat slower flame speeds than full detonation combustion.

Combustion in the fluidic injection subassembly 50 shown in FIG. 3 produces a high pressure, high temperature supersonic exhaust jet. Combustion in the combustion tube 52 raises the pressure of the bleed air by a factor of about 4-to-1 to about 8-to-1, although the particular resultant pressure in the combustion tube 52 can vary for different applications. The supersonic pressure waves and the exhaust jet are directed out of the outlet nozzle 60 of the combustion tube 52, such that the fluidic injection assembly can produce a fluid injection flow at a combustion nozzle of an aircraft to provide effective nozzle area control and/or thrust vectoring as discussed above. The air valve 28 then allows bleed air to purge the remaining combustion products from the combustion tube 52. This cycle of combustion and purging continues at an operating frequency of up to about 1 kHz according to control signals from a control system or pilot. When the fluidic injection system is not combusting (i.e., the system is in an "off" condition), bleed air can be left flowing through the subassembly 50 or can be shut off with the air valve 28 (or the bleed valve 24 described with respect to FIG. 1).

Figure 5:
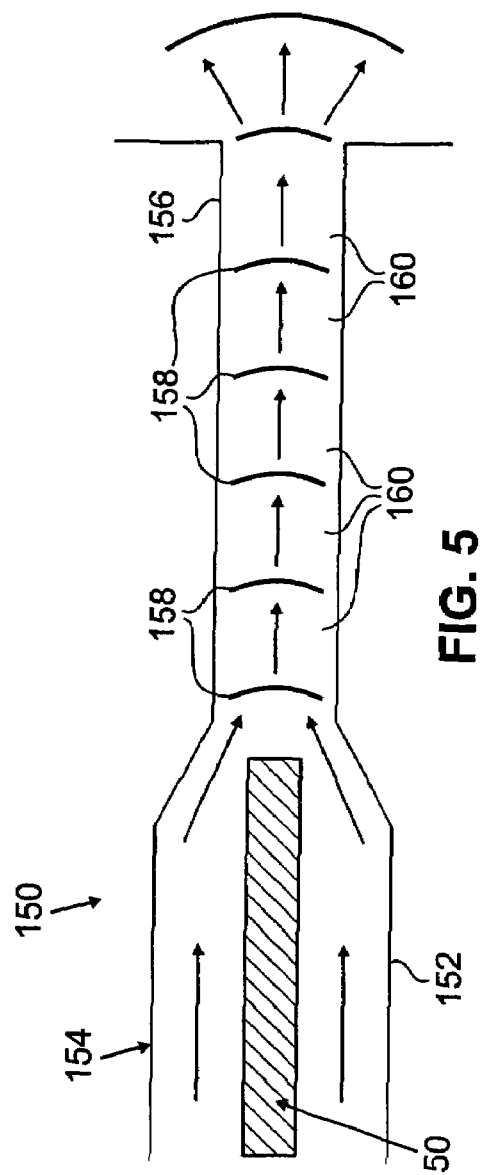
FIG. 5 is a schematic cross-sectional view of a second embodiment of a fluidic injection subassembly.

Alternative embodiments of fluidic injections assemblies according to the present invention are contemplated. FIG. 5 is a schematic cross-sectional view of a second embodiment of a fluidic injection subassembly 150. The subassembly 150 includes a fluidic injector subassembly 50 similar to that described with respect to FIG. 3. The subassembly 50 is positioned within an inlet portion 152 of a secondary tube 154. The subassembly 50 defines a cross-sectional area $A_1$, and the inlet portion of the secondary tube 154 defines a cross-sectional area $A_2$. The inlet portion 152 of the secondary tube 154 provides a generally annular secondary flowpath for secondary bleed air (e.g., liner cooling air, fan bleed air or compressor bleed air) to flow past the subassembly 50. A mixing tube 156 is connected to the downstream end of the inlet portion 152 of the secondary tube 154. Secondary bleed air from the secondary tube 154 and primary exhaust flow from the subassembly 50 combine in the mixing tube 156. Primary exhaust flow from the subassembly 50 produces high pressure waves 158 and corresponding low pressure regions 160 that follow each of the high pressure waves 158. The secondary bleed air is drawn into the low pressure regions 160, and is entrained and driven along with the primary exhaust flow by the next downstream high pressure wave 158. This produces a "pumping" action due to the unsteady flow through the mixing tube 156. The unsteady flow from the mixing tube 156 can ultimately be directed to an engine combustion nozzle to provide fluidic injection as described above. The performance of the subassembly 150 is a function of the operating frequency of the subassembly 50, the high pressure wave 158 amplitude, the ratio of $A_2$ to $A_1$, the pressure ratio (between primary exhaust flow and secondary bleed air), and a length of the mixing tube 156.

An advantage of this embodiment is that the non-steady-state "pumping" action is more efficient (in terms of flowthrough per time) than steady-state ejectors that rely on shear layer mixing for energy transfer. The secondary bleed air also keeps the combustion nozzle area cooler, although the mixing of the primary exhaust flow with the secondary bleed air will result in some loss of temperature, pressure and velocity. However, energy losses can be offset with gains from using less "expensive" fan bleed air rather than more "expensive" compressor bleed air.

Figure 6:
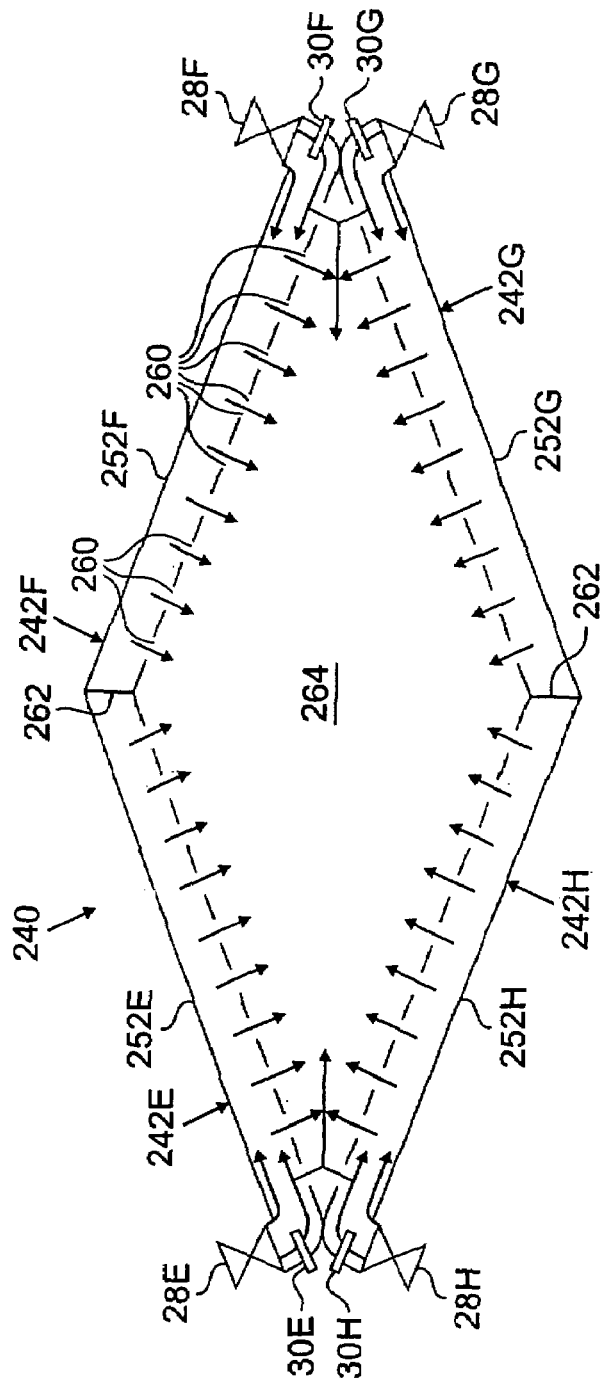
FIG. 6 is a schematic cross-sectional view of a second embodiment of a combustion nozzle utilizing a number of fluidic injection assemblies.

FIG. 6 is a schematic cross-sectional view of a second embodiment of a combustion nozzle 240 utilizing four fluidic injection assemblies 242E-242H. The combustion nozzle 240 has a diamond-like cross-sectional shape. The fluidic injection assemblies 242E-242H each include an air valve 28E-28H, a fuel injector 30E-30H, and a combustion tube 252E-252H, respectively. The air valves 28E-28H and the fuel injectors 30E-30H can be configured like those described with respect to FIG. 3.

Figure 7:
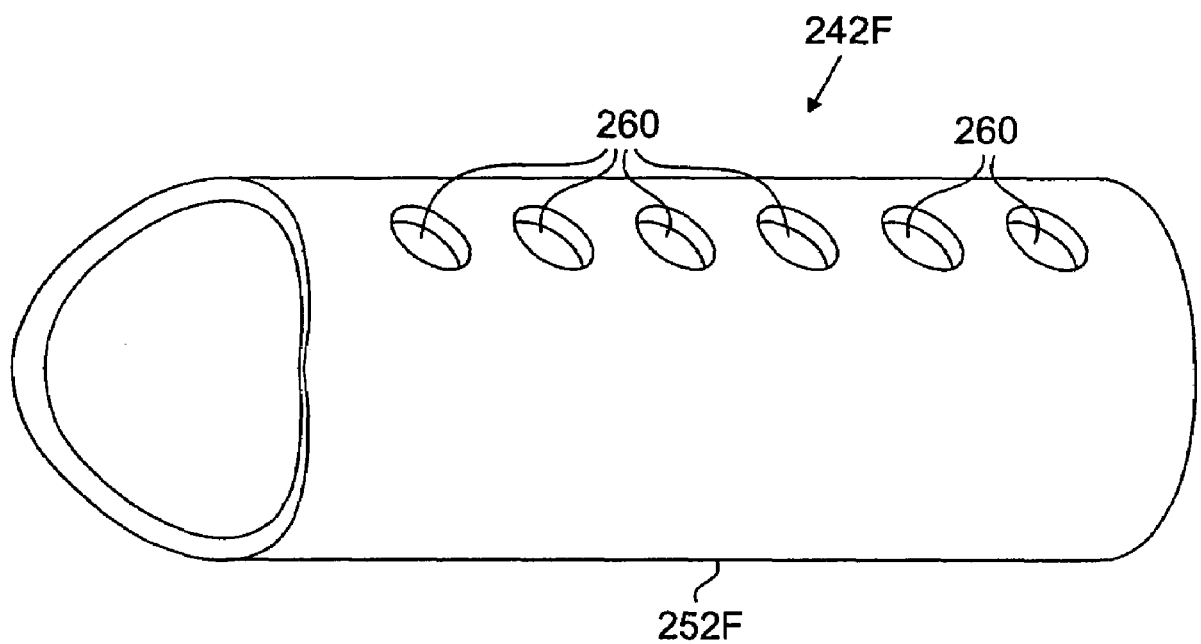
FIG. 7 is an isometric view of a portion of a combustion tube of the combustion nozzle of FIG. 6.

In the embodiment shown in FIG. 6, the air valves 28E-28H are each positioned at approximately 90° with respect to the respective fuel injectors 30E-30H. The combustion tubes 252E-252H, which can have a generally cylindrical shape, include a plurality of outlets 260 (i.e., exhaust ports) defined therethrough (for clarity, only the outlets in combustion tube 252F are labeled in FIG. 6). In the illustrated embodiment, ten substantially equally spaced circular outlets 260 are provided in each combustion tube 252E-252H, and arranged in a linear pattern facing a throat area of the combustion nozzle 240. FIG. 7 is an isometric view of a portion of the combustion tube 252F of the fluidic injection assemblies 242F showing the arrangement of the outlets 260. The plurality of outlets 260 in each combustion tube 252E-252H allow bifurcated operation, with pressure waves in the combustion tubes 252E-252H and reflection waves off of distal combustion tube walls 262 to propel high-pressure, high-temperature, supersonic combustion products from the outlets 260 and into a throat area 264 of the combustion nozzle 240. As used herein, the term "throat area" can encompass a divergent section or expansion surface of the combustion nozzle 240.

An advantage of the embodiment of the combustion nozzle 240 shown in FIG. 6 is that it can potentially reduce the flow regulation and ignition components required to implement the fluid injection system according to the present invention. This provides space-, cost- and weight-saving benefits.

It should be recognized that other configurations of the embodiment of the combustion nozzle 240 and fluidic injection assemblies 242E-242H are contemplated. For instance, the combustor tubes 252E-252H and the outlets 260 can have other configurations as desired, and the secondary tubes described with respect to FIG. 5 can be incorporated with the assemblies 242E-242H as desired.

It will be recognized that the present invention can provide one or more advantages. The fluidic injection assembly of the present invention is relatively compact and lightweight, and can provide about a 25-75% increase in throat area control and about a 2.5-3.5° increase in vector control over known non-combusting fluidic injection systems. Moreover, augmenting engine bleed air flow using pressure rise combustion as part of the fluidic injection process can provide increased injection flow pressure and increased injection flow temperature, resulting in higher injection flow momentum. No oxygen injection is required to accomplish this combustion. Combusting fluidic injection according to the present invention also permits the use of fan bleed air, and the use of fan bleed air is considered less costly to primary flowpath engine efficiency than the use of compressor bleed air. In addition, the present invention allows fluidic injector assembly operation using both full detonation and fast deflagration combustion schemes.

Although the present invention has been described with reference to preferred embodiments, workers skilled in the art will recognize that changes may be made in form and detail without departing from the spirit and scope of the invention. For instance, the valve and ignition assembly and subassembly design will vary depending upon control requirements for particular vehicle applications.

What is claimed is:

1. A fluid flow system in use with a gas turbine engine, the system comprising:
   an exhaust nozzle defining a physical throat area and divergent section;
   a primary air supply valve;
   a distribution manifold connected to the primary air supply valve and in fluid communication therewith;
   a plurality of fluid injector assemblies positioned at the exhaust nozzle and in fluid communication with the distribution manifold, wherein each fluid injector assembly comprises:
      a first tube;
      a secondary air valve positioned at least partially within the first tube and in fluid communication with the distribution manifold wherein the secondary air valve comprises a passive air check valve;
      a fuel valve positioned at least partially within the first tube and located downstream of the secondary air valve;
      an igniter extending into the first tube downstream of the fuel valve; and
      an outlet in fluid communication with the first tube and in fluid communication with the exhaust nozzle, wherein the outlet has a geometry that changes a shape of fluid flow exiting the first tube,
   wherein at least one of the plurality of fluid injector assemblies is configured to produce a pressure rise between approximately four to approximately eight times the pressure of supplied air utilized for combustion of a fuel/air mixture in the at least one of the plurality of fluid injector assemblies.

2. The system of claim 1, wherein the first tube of each of the fluid injector assemblies has a diameter of about 1 inch to about 4 inches.

3. The system of claim 1, wherein each of the fluid injector assemblies further comprises:
   a second tube for providing a secondary fluid flow, wherein the first tube extends within the second tube, and wherein the second tube is connected to the outlet.

4. The system of claim 1, wherein the fuel valve of each fluid injector assembly comprises a solenoid valve.

5. The system of claim 1, wherein each of the injector assemblies is configured to provide detonation of a mixture of air from the secondary air valve and fuel from the fuel valve when ignited by the igniter.

6. The system of claim 1, wherein each of the injector assemblies is configured to provide fast deflagration combustion of a mixture of air from the secondary air valve and fuel from the fuel valve when ignited by the igniter.

7. The system of claim 1, wherein the outlet tube has a plurality of openings for permitting fluid to pass to the exhaust nozzle.

8. A fluid flow system in a gas turbine engine, the system comprising:
   a fixed-geometry exhaust nozzle physically defining a throat area and a divergent section;
   a primary air supply valve for selectively supplying air from an air source;
   a fluid injector assembly positioned at the exhaust nozzle and connected in fluid communication with the primary air supply valve, wherein the fluid injector assembly comprises:
      a first tube;
      a passive air check valve positioned substantially within the first tube and in fluid communication with the primary air supply valve;
      a fuel valve extending within the first tube and located downstream of the air valve;
      an igniter extending into the first tube located downstream of the fuel valve;
      an outlet in fluid communication with the first tube and connected in fluid communication with the exhaust nozzle,
   wherein the injector assembly is configured to provide fast deflagration combustion of a mixture of air from the passive air check air valve and fuel from the fuel valve when ignited by the igniter.

9. The system of claim 8, wherein the first tube of the fluid injector assembly has a diameter of about 1 inch to about 4 inches.

10. The system of claim 8, wherein the fluid injector assembly further comprises:
    a second tube for providing a secondary fluid flow, wherein the first tube extends within the second tube, and wherein the second tube is connected to the outlet.

11. The system of claim 8, wherein the fuel valve of the fluid injector assembly comprises a solenoid valve.

12. The system of claim 8, wherein the outlet tube has a plurality of openings for permitting fluid to pass to the exhaust nozzle.

13. A fluid flow system in a gas turbine engine, the system comprising:
    an exhaust nozzle defining a throat area and a divergent section;

a plurality of fluid injector assemblies positioned at the exhaust nozzle, wherein each fluid injector assembly comprises:

an air valve for controllably providing fan bleed air from the gas turbine engine;

a fluid chamber, wherein the air valve provides an air outlet into the fluid chamber; a passive air check valve positioned substantially within the fluid chamber and in fluid communication with the air valve;

a fuel valve, wherein the fuel valve provides a fuel outlet within the fluid chamber;

an igniter extending into the fluid chamber for igniting fuel and air mixtures to produce combustion that raises pressure;

an outlet tube in fluid communication with the fluid chamber and connected in fluid communication with the exhaust nozzle, wherein the outlet tube of each fluidic injection assembly has a plurality of bifurcation openings for permitting fluid to pass to the exhaust nozzle.

14. The system of claim 13, wherein the fuel valve of the fluid injector assembly comprises a solenoid valve.

15. The system of claim 13, wherein each injector assembly is configured to provide detonation of a mixture of air from the secondary air valve and fuel from the fuel valve when ignited by the igniter.

16. The system of claim 13, wherein each injector assembly is configured to provide fast deflagration combustion of a mixture of air from the air valve and fuel from the fuel valve when ignited by the igniter.

17. The system of claim 13, wherein at least one of the plurality of fluid injector assemblies is configured to produce a pressure rise of at least about 4 times the pressure of the fan bleed air utilized and up to about 8 times the pressure of the fan bleed air utilized.

18. The system of claim 1, wherein the outlet is configured as a slot shaped nozzle defining a substantially rectangular opening.

19. The system of claim 18, wherein the first tube has a substantially cylindrical shape.

20. The system of claim 8, wherein the first tube has a substantially cylindrical shape, and wherein the outlet is configured as a slot shaped nozzle defining a substantially rectangular opening.

* * * * *

UNITED STATES PATENT AND TRADEMARK OFFICE
CERTIFICATE OF CORRECTION

| | | |
|---|---|---|
| PATENT NO. | : 7,775,460 B2 | Page 1 of 1 |
| APPLICATION NO. | : 11/585597 | |
| DATED | : August 17, 2010 | |
| INVENTOR(S) | : Gerald R. Berg et al. | |

It is certified that error appears in the above-identified patent and that said Letters Patent is hereby corrected as shown below:

Col. 7, line 39 Delete "use with"

Signed and Sealed this
Eighth Day of March, 2011

David J. Kappos
*Director of the United States Patent and Trademark Office*